US008255614B2

(12) United States Patent
Omizo et al.

(10) Patent No.: US 8,255,614 B2
(45) Date of Patent: Aug. 28, 2012

(54) INFORMATION PROCESSING DEVICE THAT ACCESSES MEMORY, PROCESSOR AND MEMORY MANAGEMENT METHOD

(75) Inventors: Takashi Omizo, Kawasaki (JP); Atsushi Kunimatsu, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 362 days.

(21) Appl. No.: 12/561,924

(22) Filed: Sep. 17, 2009

(65) Prior Publication Data

US 2010/0185804 A1 Jul. 22, 2010

(30) Foreign Application Priority Data

Jan. 16, 2009 (JP) ................................. 2009-008079

(51) Int. Cl.
*G06F 12/00* (2006.01)
(52) U.S. Cl. ................ 711/103; 711/165; 711/E12.001; 365/185.23; 365/185.29; 365/185.33
(58) Field of Classification Search .................. 711/103, 711/165, E12.001, E12.008; 365/185.23, 365/185.29, 185.33
See application file for complete search history.

(56) References Cited

U.S. PATENT DOCUMENTS

| 2004/0128470 | A1* | 7/2004 | Hetzler et al. | ................ 711/209 |
| 2008/0043547 | A1* | 2/2008 | Jeong et al. | ................... 365/194 |
| 2008/0147998 | A1 | 6/2008 | Jeong | |
| 2008/0244165 | A1* | 10/2008 | Kunimatsu | .................... 711/103 |
| 2009/0083478 | A1 | 3/2009 | Kunimatsu | |

FOREIGN PATENT DOCUMENTS

| CN | 1512353 | 7/2004 |
| JP | 7-146820 | 6/1995 |
| JP | 2001-266580 | 9/2001 |
| JP | 2004-94963 | 3/2004 |
| KR | 10-2008-0056580 | 6/2008 |
| KR | 10-2008-0072605 | 8/2008 |

OTHER PUBLICATIONS

Office Action issued in Chinese Patent Application No. 201010003547.9, dated May 25, 2011, mailed Jun. 28, 2011, including English translation, 7 pages.
Office Action issued in Korean Patent Application No. 10-2010-4020, mailed Mar. 30, 2011, including English translation, 9 pages.

* cited by examiner

*Primary Examiner* — Jasmine Song
(74) *Attorney, Agent, or Firm* — Sprinkle IP Law Group

(57) ABSTRACT

An information processing device of an example of the invention comprises an address generation section that generates a write address indicating a write position in a nonvolatile memory so that the write position is shifted in order to suppress each number of times of overlapped writing for each position of the nonvolatile memory when a write operation to the nonvolatile memory from a processor is performed, an order generation section that generates order information indicating a generation order of the writing operation, and a write control section that stores write information to the write address, and stores the order information to the nonvolatile memory so that the order information is related to at least one of the stored write information and the write address.

20 Claims, 10 Drawing Sheets

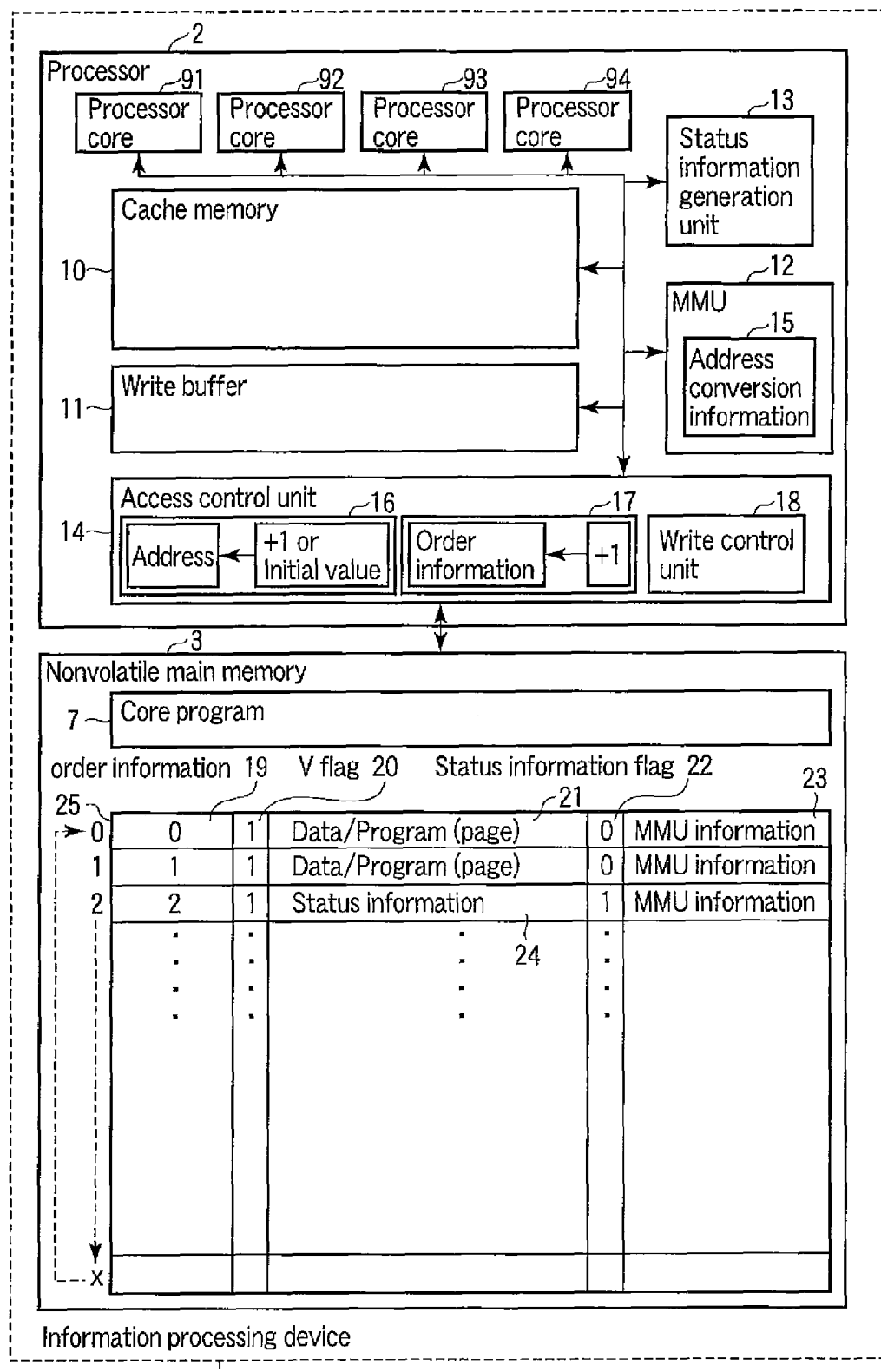
F I G. 1

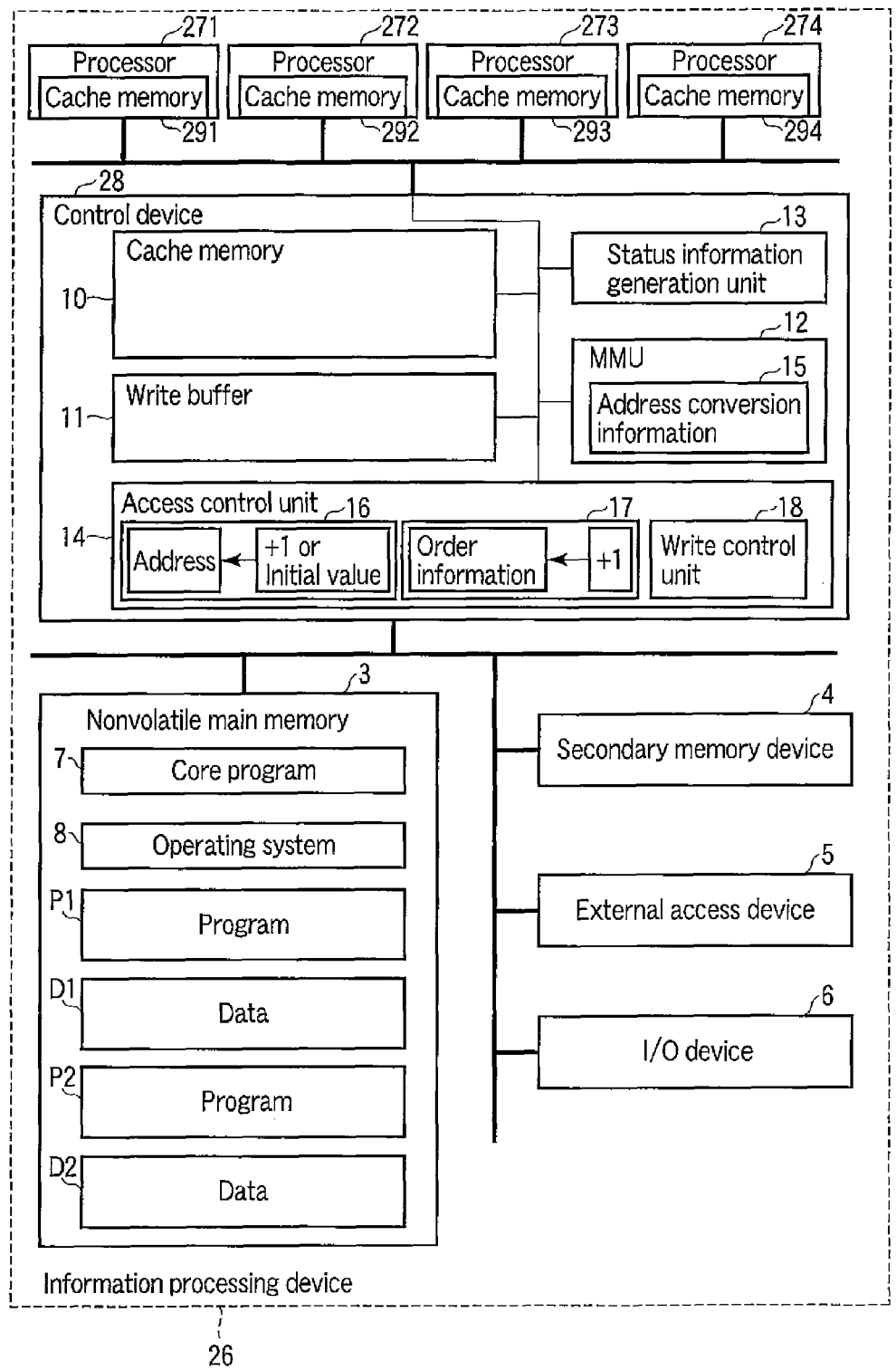
F I G. 6

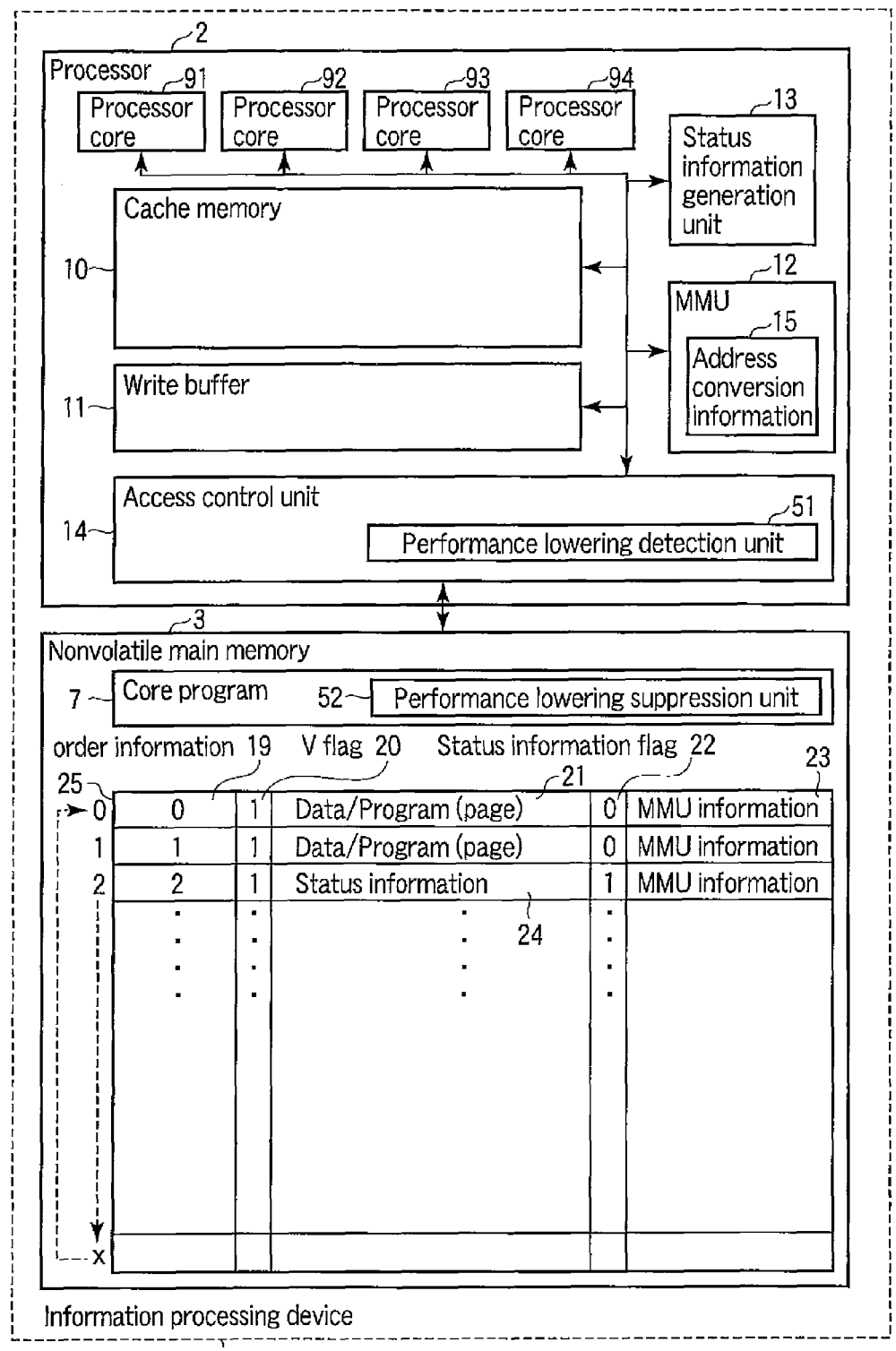
F I G. 10

US 8,255,614 B2

INFORMATION PROCESSING DEVICE THAT ACCESSES MEMORY, PROCESSOR AND MEMORY MANAGEMENT METHOD

CROSS-REFERENCE TO RELATED APPLICATIONS

This application is based upon and claims the benefit of priority from prior Japanese Patent Application No. 2009-008079, filed Jan. 16, 2009, the entire contents of which are incorporated herein by reference.

BACKGROUND OF THE INVENTION

1. Field of the Invention

The present invention relates to an information processing device that accesses a memory, processor, and memory management method.

2. Description of the Related Art

In the conventional information processing device, a volatile memory such as a dynamic random access memory (DRAM), for example, is used as a main memory of a processor. Further, in the conventional information processing device, a secondary memory (storage) device is used in combination with the volatile memory.

In the conventional information processing device, the contents of the main memory are lost if the power source thereof is turned off. Therefore, in the conventional information processing device, the boot operation of a system is required at each boot time, it is required to move a program or data from the secondary memory device to the main memory for program starting or data reading and it takes a long time for execution.

Further, in the conventional information processing device, the contents of the main memory cannot be maintained if the power source thereof is turned off. Therefore, when the conventional information processing device is not correctly shut down, there occurs a possibility that data, a system or program will be destroyed.

In a Document 1 (Jpn. Pat. Appln. KOKAI Publication No. H7-146820), a technique for utilizing a flash memory as a main memory of an information processing device is disclosed. In the Document 1, the flash memory is connected to a memory bus of a system via a cache memory that is a volatile memory. In the cache memory, an address array that records information such as an access history or an address of data stored in the cache memory is provided. A controller refers to an address of an access destination, and supplies data of the cache memory or flash memory to the memory bus or stores data of the memory bus.

A document 2 (Jpn. Pat. Appln. KOKAI Publication No. 2001-266580) discloses an invention enable different kind of semiconductor memory devices to be connected to a common bus.

The semiconductor memory device disclosed in the document 2 includes a random access memory chip and a package having the random access memory chip. The package comprises a plurality of pins electrically connecting the random access memory chip to an external device. The pins provide a memory function in common to a random access memory and an electrically erasable and programmable non-volatile semiconductor memory. The pins are arrayed according to the corresponding pin position of the non-volatile semiconductor memory.

BRIEF SUMMARY OF THE INVENTION

An information processing device of a first example of the invention comprises: an address generation section that generates a write address indicating a write position in a nonvolatile memory so that the write position is shifted in order to suppress each number of times of overlapped writing for each position of the nonvolatile memory when a write operation to the nonvolatile memory from a processor is performed; an order generation section that generates order information indicating a generation order of the writing operation; and a write control section that stores write information to the write address generated by the address generation section, and stores the order information to the nonvolatile memory so that the order information is related to at least one of the stored write information and the write address.

A processor of a second example of the invention comprises: an address generation section that generates a write address indicating a write position in a nonvolatile memory so that the write position is shifted in order to suppress each number of times of overlapped writing for each position of the nonvolatile memory when a write operation to the nonvolatile memory is performed; an order generation section that generates order information indicating a generation order of the writing operation; and a write control section that stores write information to the write address generated by the address generation section, and stores the order information to the nonvolatile memory so that the order information is related to at least one of the stored write information and the write address.

A memory management method of a third example of the invention comprises: generating a write address indicating a write position in a nonvolatile memory so that the write position is shifted in order to suppress each number of times of overlapped writing for each position of the nonvolatile memory when a write operation to the nonvolatile memory from a processor is performed, and generating order information indicating a generation order of the writing operation; and storing write information to the generated write address, and storing the order information to the nonvolatile memory so that the order information is related to at least one of the stored write information and the write address.

BRIEF DESCRIPTION OF THE SEVERAL VIEWS OF THE DRAWING

FIG. 1 is a block diagram showing one example of a detailed configuration of an information processing device according to a first embodiment of the invention;

FIG. 6 is a block diagram showing one example of a configuration of an information processing device according to a second embodiment of the invention;

FIG. 10 is a block diagram showing one example of a configuration of an information processing device according to a fifth embodiment of the invention.

DETAILED DESCRIPTION OF THE INVENTION

Embodiments of the present invention will be described below with reference to the drawings. In the description below, substantially the same functions and components are denoted by the same reference numbers. Duplicate descriptions will be given only when required.

First Embodiment

In an information processing device according to the present embodiment, a nonvolatile main memory (main storage device) is utilized for a processor.

Even when the processor uses the nonvolatile main memory for an application different from an application for a main memory, the same access control operation can be used.

In this embodiment, for example, it is supposed that the information processing device includes a processor such as a micro processing unit (MPU) or the processor and a memory.

FIG. 1 is a block diagram showing one example of a detailed configuration of the information processing device according to this embodiment.

Figure 2:
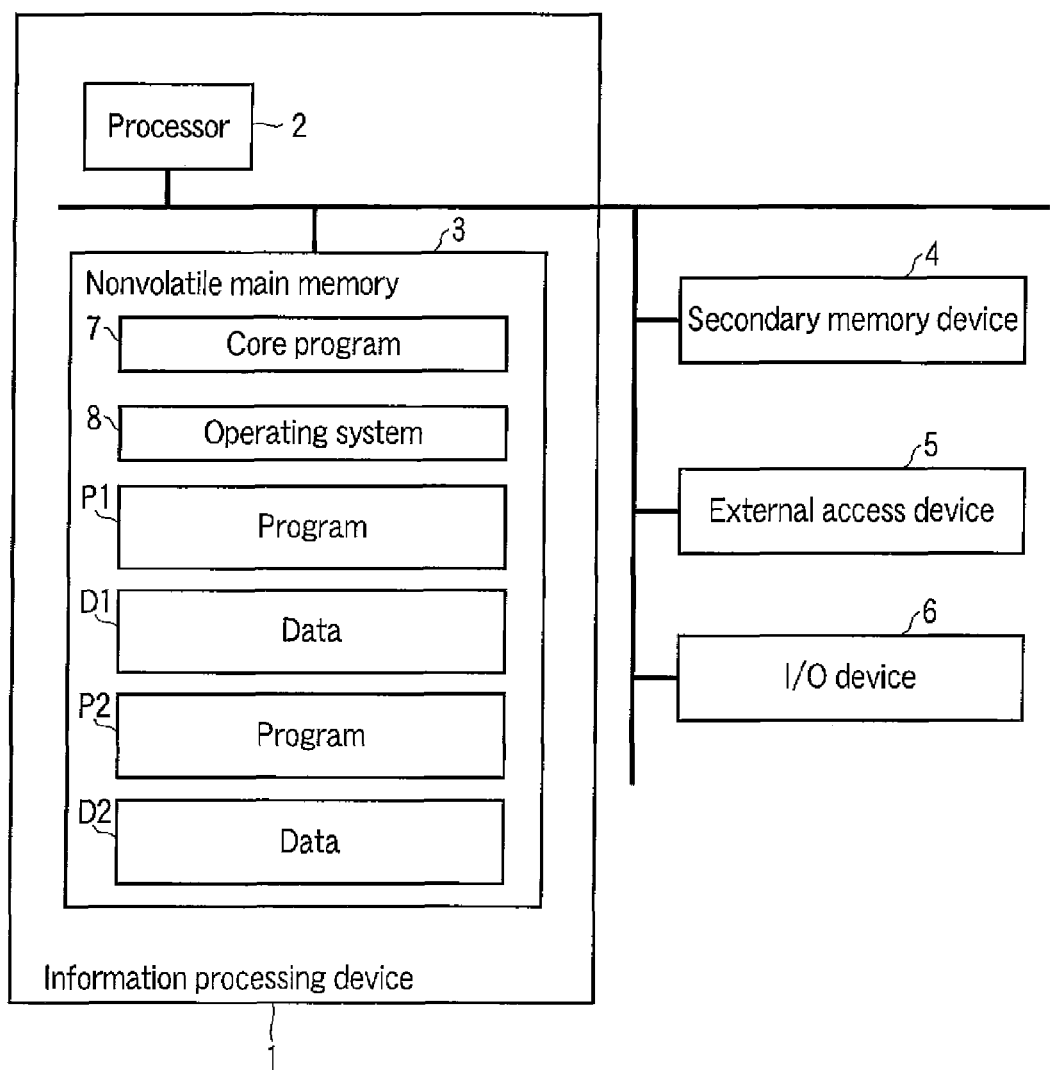
FIG. 2 is a block diagram showing one example of a schematic configuration of the information processing device according to the first embodiment.

Further, FIG. 2 is a block diagram showing one example of a schematic configuration of the information processing device according to this embodiment.

An information processing device 1 includes a processor 2 and nonvolatile main memory 3. The processor 2 can access various devices such as a secondary memory (storage) device 4, external access device 5 and I/O device 6. A device such as the secondary memory device 4, external access device 5 or I/O device 6 can be provided as part of the information processing device 1.

As the nonvolatile main memory 3, for example, a flash memory is used. As the flash memory, a NAND or NOR type flash memory can be used. Another semiconductor memory can be used as the nonvolatile main memory 3.

For example, the nonvolatile main memory 3 stores a core program (for restoration) 7, operating system 8, various programs (instructions) such as programs P1, P2, and various data items such as data items D1, D2.

For example, the above various programs and data items in the nonvolatile main memory 3 are stored from the secondary memory device 4, external access device 5 and I/O device 6 into the nonvolatile main memory 3 or stored from the processor 2 into the nonvolatile main memory 3.

The processor 2 includes at least one processor core (four in the drawing) 91 to 94, cache memory 10, write buffer 11 and memory management unit (MMU) 12 and further includes a status information creation unit (for example, PSW control unit) 13 and access control unit 14.

The processor cores 91 to 94 respectively access the cache memory 10 or nonvolatile main memory 3 and execute programs. The processor cores 91 to 94 can be operated in parallel.

The write buffer 11 is provided in the output stage of the cache memory 10 and the content (a page including at least one of a program and data, for example) of the cache memory 10 is stored in the nonvolatile main memory 3 via the write buffer 11.

In this embodiment, for example, it is supposed that the write, read and erase operations with respect to the cache memory 10 and nonvolatile main memory 3 are performed in the preset page unit, in the block unit of block size larger than page size, in the unit that is an integral multiple (two or more times) of the page size or in the unit that is an integral multiple (two or more times) of the block size.

In the present embodiment, it is supposed that the cache entry size of the cache memory 10 and the memory access size of the nonvolatile main memory 3 are set to page size. Thus, the memory management of the cache memory 10 and nonvolatile main memory 3 and the access control of the nonvolatile main memory 3 can be simplified. Further, a hardware amount of the information processing device 1 can be reduced and the processing efficiency of the information processing device 1 can be enhanced.

The memory management unit 12 includes address conversion information 15 having logical addresses such as virtual addresses and physical addresses that are associated with one another for the cache memory 10 and nonvolatile main memory 3 and makes a conversion between the logical address and the physical address.

The status information creation unit 13 derives status information (for example, program status word: PSW) expressing the processor status and program status at preset timing. For example, the status information creation unit 13 generates status information each preset time has elapsed. Further, for example, the status information creation unit 13 generates status information whenever the number of times of write operations from the processor 2 to the nonvolatile main memory 3 is above a preset number.

The access control unit 14 controls access between the processor 2 and the nonvolatile main memory 3, for example, at write operation and read operation of data/program (at least one of data or program) from the processor 2 to the nonvolatile main memory 3 and erase operation of data/program in the nonvolatile main memory 3. In this embodiment, the write and read operations with respect to the nonvolatile main memory 3 may be performed in the page unit, for example, and the erase operation may be performed in the block unit, for example. However, the write, read and erase operations can be performed in the unit of different sizes.

In this embodiment, the access control unit 14 includes an address generation unit 16, order (sequence) generation unit 17 and write control unit 18.

When writing of data/program from the processor 2 to the nonvolatile main memory 3 occurs, the address generation unit 16 generates a write address to deviate (shift) the write position (for example, sequentially) in order to suppress the number of times of overlapped write positions (to equalize the numbers of times of write operations) according to a preset rule.

For example, it is possible for the address generation unit 16 to sequentially increase an address value used as a write destination starting from a preset initial value and then sequentially increase an address value used as a write destination starting from the preset initial value again when the address value reaches a preset final value which is larger than the initial value.

Further, it is also possible for the address generation unit 16 to sequentially decrease an address value used as a write destination starting from a preset initial value and then sequentially decrease an address value used as a write destination starting from the preset initial value again when the address value reaches a preset final value which is smaller than the initial value.

Further, for example, it is possible for the address generation unit 16 to repeatedly perform an operation of sequentially generating address values of write destinations with several spaces blanked (for example, at preset intervals) in a first cycle, then sequentially generating address values of write destinations in the blanked spaces that are not written in the first cycle in a second cycle, and in the same manner, sequentially generating address values of write destinations in the blanked spaces that are not written in the cycles to an (n−1)th cycle in an nth cycle. In addition, when the number of available blanked spaces becomes smaller than or equal to a preset value (for example, when all of the available blanked spaces are used up), the same operation may be repeatedly performed starting from the first cycle.

Further, the address generation unit 16 refers to the address conversion information 15 of the memory management unit 12 to generate only unused addresses in the address conversion information 15 as write addresses.

An additional write operation for the nonvolatile main memory 3 is performed by the operation of the address generation unit 16.

The order generation unit 17 generates order (sequence) information indicating a generation time order of each write operation to determine a time order of the write operation. By utilizing the order information, the newest value of specified data can be obtained. In this embodiment, the order generation unit 17 increases a count each time the write operation with respect to the nonvolatile main memory 3 is performed and uses the count value as the order information. By storing the order information in the nonvolatile main memory 3 in association with to-be-written data/program (write target page), it can be determined that the data/program having the largest order information is the newest when the write operation for the same data/program is performed in plural positions.

The write control unit 18 controls the write process from the processor 2 to the nonvolatile main memory 3.

The write control unit 18 sets a V (Valid) flag of to-be-written entry to "1" at the normal write time. By using the V flag, whether the to-be-written entry is valid or invalid can be determined.

The write control unit 18 performs an erase operation for a block that is determined not to be used in the memory management unit 12 even if the V flag on the nonvolatile main memory 3 is "1", then performs a write operation again and sets the V flag to "1".

The write control unit 18 determines whether V flags of a preset number or more are set to "1" (for example, whether all of the V flags are set to "1") or not, and if V flags of a preset number or more are set to "1", exception processing (handling) is performed to clean up an unnecessary portion in the nonvolatile main memory 3 by use of software, erase the corresponding portion and set the V flag to "0".

In this embodiment, the write control unit 18 stores the order information (count value) 19 generated by the order generation unit 17, V flag 20 ("1"), to-be-written data/program (page) 21, status information flag 22 ("0") and MMU information 23 to the address generated by the address generation unit 16 at the time of writing with respect to the nonvolatile main memory 3.

In this case, the status information flag 22 is information indicating whether or not it is entry to write status information. When the entry indicates writing of status information, "1" is set into the status information flag 22, and when the entry does not indicate writing of status information, "0" is set in the status information flag 22.

Further, the write control unit 18 writes entry in association with generated status information 24 when new status information is generated by the status information creation unit 13. At the write time of the status information 24, the write control unit 18 stores the order information 19 generated by the order generation unit 17, V flag 20 ("1"), status information 24, status information flag 22 ("1") and MMU information 23 to addresses generated by the address generation unit 16.

In this embodiment, the nonvolatile main memory 3 stores the core program 7. The core program 7 is executed by at least one of the processor cores 91 to 94 of the processor 2 when a status of the processor 2 is restored, for example, when a power source of the information processing device 1 is turned on again.

The processor 2 sequentially reads the contents of the nonvolatile main memory 3 (written entry, order information 19, V flag 20, status information flag 22, MMU information 23 and the like) according to the core program 7, obtains the status information 24 of the newest status based on the order information 19 and restores the processor 2 by use of the newest status information 24.

Further, the processor 2 reads MMU information 23 of the newest status based on the order information 19 according to the core program 7 and restores the memory management unit 12 of the processor 2 by use of the newest MMU information 23.

The core program 7 may select status information items 24 and MMU information items 23 with which the processor 2 can be properly operated again and restore the processor 2 by use of the newest status information 24 and MMU information 23 among the thus selected status information items 24 and MMU information items 23.

For example, the core program 7 may select a combination of the status information 24 and MMU information 23 indicating that the V flag 20 is valid and the order information 19 is the newest among combinations of status information items 24 and MMU information items 23 stored in relation to one another and restore the processor 2 by use of the selected newest status information 24 and MMU information 23.

In this embodiment, the processor 2 is restored by use of the core program 7 stored in the nonvolatile main memory 3. However, for example, a restoration unit that performs the same process as that of the processor core that executes the core program 7 may be used. In this embodiment, a configuration of the information processing device 1 can be simplified by using the core program 7.

In FIG. 1, the core program 7 and a data unit 25 used as a main memory are contained in the nonvolatile main memory 3 and the order information 19, V flag 20, data/program 21 or status information 24, status information flag 22 and MMU information 23 are contained for each entry in the data unit 25.

However, the storage form of the nonvolatile main memory 3 is not limited to the status shown in FIG. 1 and it is sufficient if various information items are set in relation to one another as required.

As described above, the cache size of the cache memory 10, the write size of the nonvolatile main memory 3, the write size of the data/program 21 and the write size of status information 24 are set in a relation of coincidence or integral multiple. As a result, the hardware amount can be reduced, the control of the nonvolatile main memory 3 can be simplified and the process of the information processing device 1 can be made efficient.

The operation of the information processing device 1 with the above configuration is explained below.

In FIGS. 1, 2, the processor 2 has a configuration that is directly connected to the nonvolatile main memory 3 such as a NAND type flash memory or NOR type flash memory, for example.

Like a normal information processing system, the information processing device 1 performs a boot process of the operating system 8 at the first boot time and develops an execution image on the nonvolatile main memory 3. Since the operating system 8 is stored in the nonvolatile main memory 3 at the later boot time, the information processing device 1 uses the operating system 8 of the nonvolatile main memory 3, omits the operation of developing the execution image on the nonvolatile main memory 3 and can directly boot the operating system 8 of the nonvolatile main memory 3.

In FIG. 2, a status in which the operating system 8, programs P1, P2 and data items D1, D2 are developed on the nonvolatile main memory 3 is shown.

The processor cores 91 to 94 perform the read operation or write operation for a page (containing at least one of the program and data and the like) by use of virtual address, for example. When a to-be-accessed page is present on the cache memory 10, the to-be-accessed page is returned from the cache memory 10 to the processor cores 91 to 94.

When a to-be-accessed page (access target page) is not present on the cache memory 10, the memory management unit 12 converts the virtual address into an address on the nonvolatile main memory 3 by use of address conversion information 12 (page table). In this case, if the address related to a to-be-accessed page is not present in the address conversion information 12 of the memory management unit 12, an exception event occurs and exception processing is performed by use of software. By the exception processing, the to-be-accessed page is stored from a device such as the secondary memory device 4, external access device 5 or I/O device 6 to the cache memory 10 or nonvolatile main memory 3.

Figure 3:
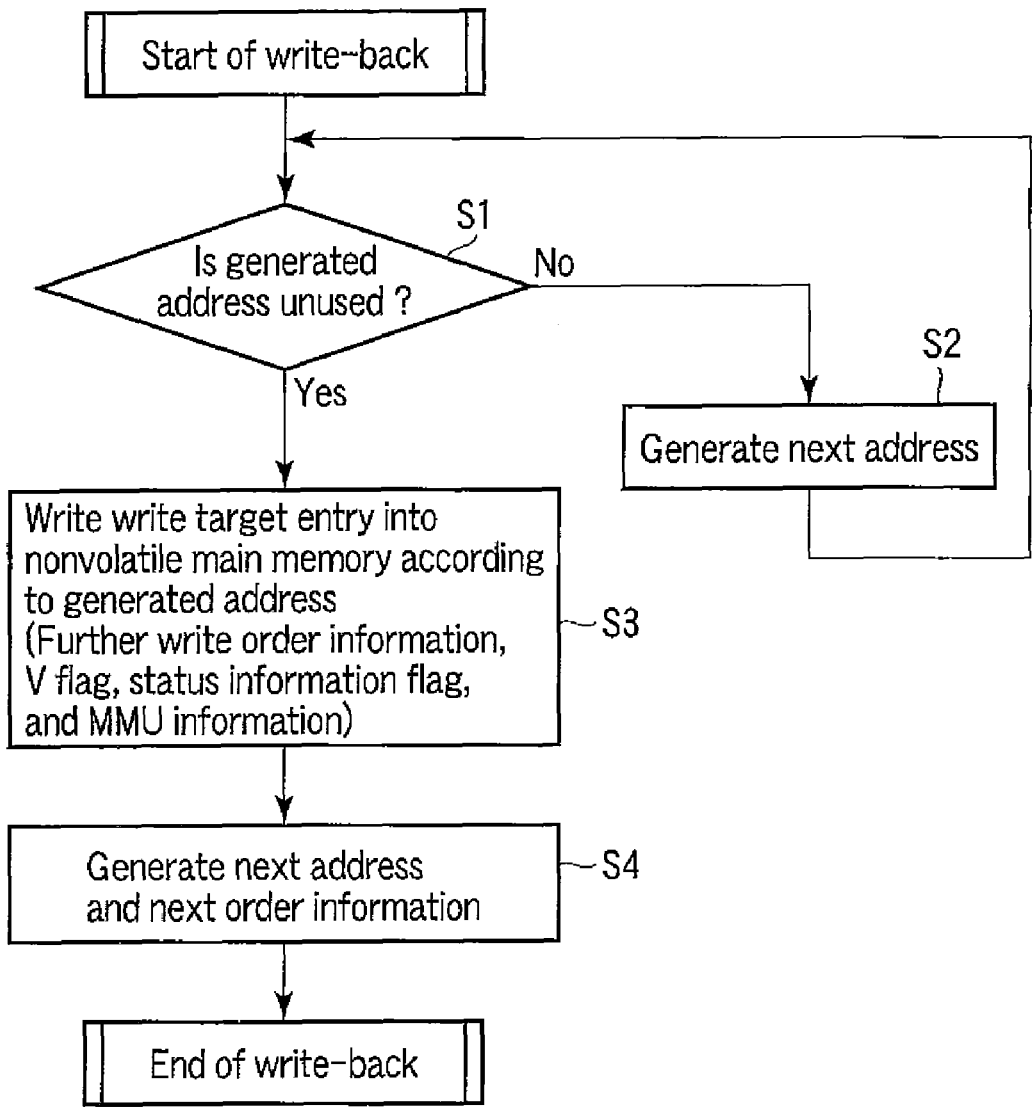
FIG. 3 is a flowchart for illustrating one example of a write-back process in the information processing device according to the first embodiment.

FIG. 3 is a flowchart for illustrating one example of a write-back process in the information processing device 1 according to this embodiment.

When a new page is fetched from the nonvolatile main memory 3 (or one of devices such as the secondary memory device 4, external access device 5 and I/O device 6) to the cache memory 10, it becomes sometimes necessary to perform a write-back process (a process of writing a page stored in the cache memory 10 into the nonvolatile main memory 3).

When the write-back process is performed, the write control unit 18 of the access control unit 14 refers to the memory management unit 12 to determine whether an address generated by the address generation unit 16 is unused or not in step S1.

When an address generated by the address generation unit 16 is in use, the address generation unit 16 of the access control unit 14 generates a next address in step S2 and the process is returned to step S1. As a result, a new page is not written over the page now used. A to-be-written address in the nonvolatile main memory 3 is skipped over to an address of next blanked entry. As in steps S1, S2, it is possible to previously detect a next unused address instead of obtaining an unused address after the write-back process is started.

When an address generated by the address generation unit 16 is not in use, the write control unit 18 returns the page to be written back (write back target page) to a position of the nonvolatile main memory 3 indicated by a generated unused address.

At this time, the write control unit 18 updates the address conversion information 15 of the memory management unit 12 to express a status set after the returning process and the present order information 19 and the MMU information 23 containing the address conversion information 15 of the memory management unit 12 are written into the nonvolatile main memory 3 for the page to be written back. Further, the write control unit 18 sets the V flag 20 to "1", sets the status information flag 22 to "0" and stores the flags into the nonvolatile main memory 3.

In this embodiment, the write process is performed according to a manner in which the order information 19, V flag 20, page 21, status information flag 22 and MMU information 23 are stored in positions of the nonvolatile main memory 3 indicated by a generated address.

After the write process in step S3, the address generation unit 16 of the access control unit 14 generates a new address in step S4 and the order generation unit 17 generates new order information.

For example, the address generation unit 16 generates a new address by increasing an address value by use of a counter. When the new address is larger than or equal to a preset value, the address generation unit 16 generates an address of an initial value and repeatedly performs the same operation. Further, for example, the order generation unit 17 increases a value indicating a writing generation order by use of a counter.

In this case, the status information creation unit 13 creates the status information 24 containing context information of the internal portion of the processor 2 when a preset status information event occurs (periodically or after the write operation is performed by a preset number of times).

The write control unit 18 of the access control unit 14 stores the status information 24 created by the status information creation unit 13 into the nonvolatile main memory 3. When the status information 24 is stored into the nonvolatile main memory 3, "1" is set in the status information flag 22 and the write operation is performed.

The status information 24 contains information necessary for restoring the operation status of the processor 2 including such as a general register, control register and program counter.

If a dirty line is present in the cache memory 10 when the status information 24 is written into the nonvolatile main memory 3, first, the dirty line is written back into the nonvolatile main memory 3. The dirty line indicates a line of the cache memory whose data content is not reflected on the main memory and whose data content does not coincide with that of the main memory.

Further, if an unrestorable status is present in the device such as the secondary memory device 4, external access device 5 or I/O device 6, the status information creation unit 13 sets the above devices into a restorable status by performing an operation such as SYNC and then creates the status information 24. Subsequently, the write control unit 18 performs a write process of the created status information 24.

Figure 4:
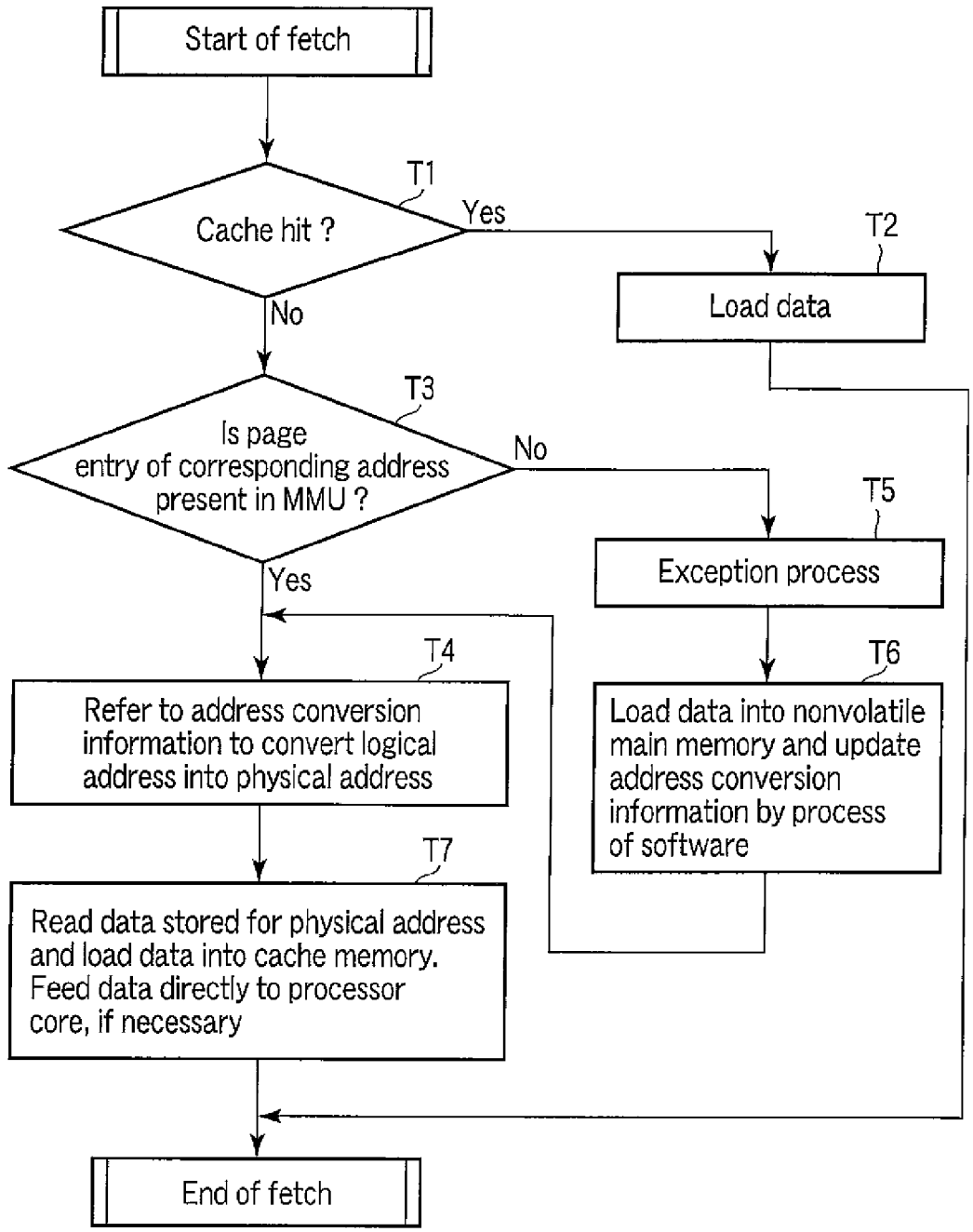
FIG. 4 is a flowchart for illustrating one example of a fetching process in the information processing device according to the first embodiment.

FIG. 4 is a flowchart for illustrating one example of a fetching process in the information processing device 1 according to this embodiment.

In step T1, the memory management unit 12 determines whether to-be-accessed data (this can be applied to a program) is stored in the cache memory 10 (cache hit) or not.

When to-be-fetched data (fetch target data) is stored in the cache memory 10, the processor cores 41 to 44 load data on the cache memory 10 in step T2.

When data is not stored in the cache memory 10, the memory management unit 12 determines whether a page entry associated with the to-be-fetched data is present in the address conversion information 15 or not in step T3.

If the page entry associated with the to-be-fetched data is present in the address conversion information 15 of the memory management unit 12, the memory management unit 12 refers to the to-be-fetched page entry of the address conversion information 15 and converts a logical address into a physical address in step T4.

If the page entry associated with the to-be-fetched data is not present in the address conversion information 15 of the memory management unit 12, the exception processing is performed in step T5.

If the exception processing is performed, the access control unit 14 loads the to-be-fetched data from the device such as the secondary memory device 4, external access device 5 or I/O device 6 into the nonvolatile main memory 3, for example, by performing a software process in step T6. The memory management unit 12 sets loaded page entry in the address conversion information 15 to update the address conversion information 15. Subsequently, the process returns to step T4.

After step T4, the access control unit 14 reads data stored in the physical address of the nonvolatile main memory 3 and loads the read data into the cache memory 10 in step T7. Further, the access control unit 14 directly feeds the read data to the processor cores 41 to 44 as required.

Figure 5:
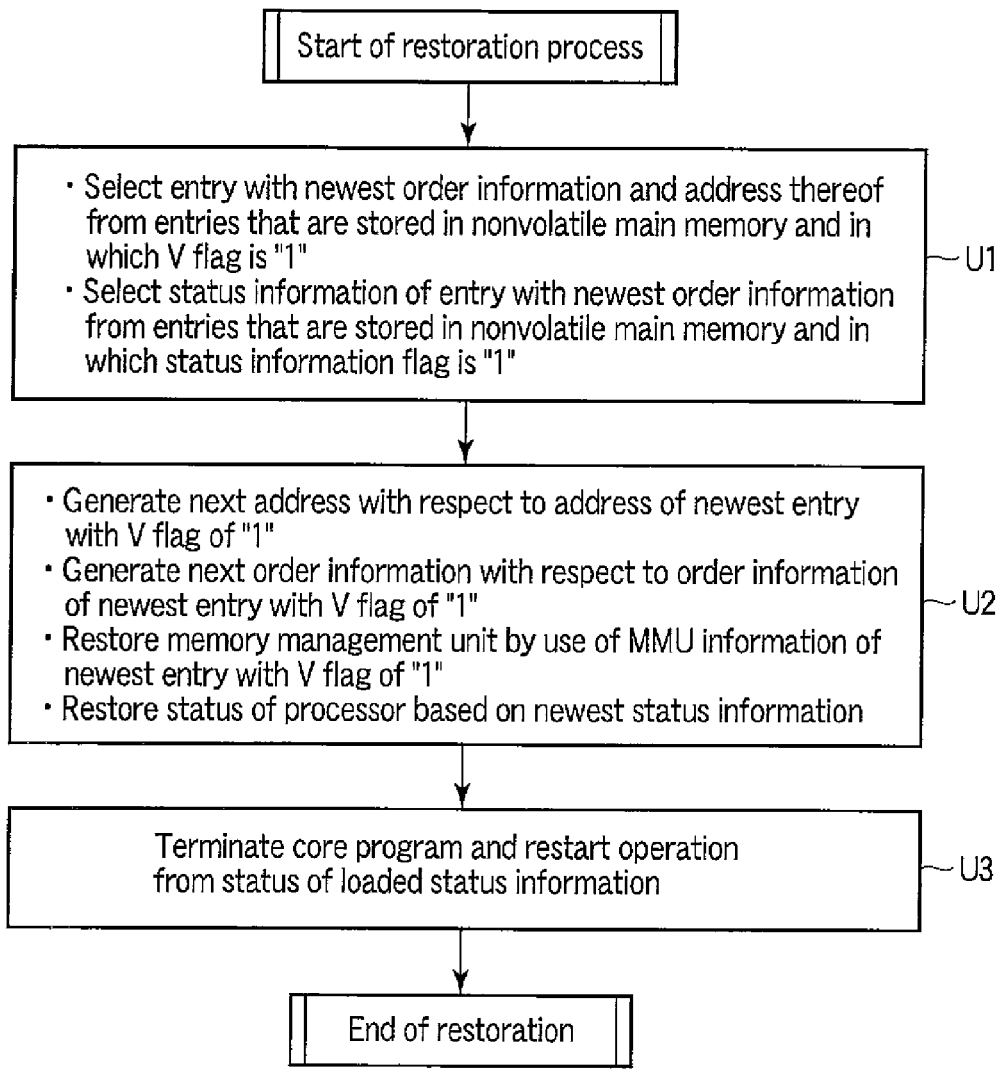
FIG. 5 is a flowchart for illustrating one example of a restoration process of the information processing device according to the first embodiment.

FIG. 5 is a flowchart for illustrating one example of a restoration process (reconstruction) of the information processing device 1 according to this embodiment.

For example, when the power source of the information processing device 1 is turned on again, the processor 2 reads a core program 7 stored in the nonvolatile main memory 3 and executes the core program 7 for restoration. The core program 7 is executed by use of at least one of the processor cores 41 to 44, but in the following description, a case wherein the core program 7 is executed by use of the processor core 41 is explained as an example.

In step U1, the processor core 41 that executes the core program 7 sequentially reads entries from the nonvolatile main memory 3.

Then, the processor core 41 that executes the core program 7 selects an entry associated with the newest order information 19 from entries associated with the V flag 20 of "1" and selects an address (newest address) of the newest entry. Further, the processor core 41 that executes the core program 7 selects the status information 24 (newest status information) of entry associated with the newest order information 19 and MMU information 23 (newest MMU information) of entry associated with the newest order information 19 from entries associated with the status information flag 22 of "1".

In step U2, the processor core 41 that executes the core program 7 causes the address generation unit 16 to generate an address next to an address of entry associated with the V flag 20 of "1" and the newest order information 19.

The processor core 41 that executes the core program 7 causes the order generation unit 17 to generate order information next to order information of entry associated with the V flag 20 of "1" and the newest order information 19.

The processor core 41 that executes the core program 7 restores the memory management unit 12 based on MMU information 23 of entry associated with the V flag 20 of "1" and the newest order information 19.

The processor core 41 that executes the core program 7 loads the status information 24 associated with the status information flag 22 of "1" and the newest order information 19 and restores the status of the processor 2 based on the loaded status information 24.

In step U3, the processor core 41 terminates execution of the core program 7 and restarts the operation starting from the status indicated by the loaded status information 24.

Next, effects of the information processing device 1 according to this embodiment as described above are explained.

In the conventional information processing device, since a volatile memory is used as the main memory, it is necessary to load the operating system, program and data at each restarting time.

On the other hand, in the information processing device 1 according to this embodiment, since the nonvolatile memory is used as the main memory and a necessary program and data are already stored in the nonvolatile main memory 3 even at the restarting time, the system boot process and program and data loading process can be reduced or the above processes can be made unnecessary and thus the operation speed of the information processing device 1 can be enhanced. That is, in the information processing device 1 according to this embodiment, the status of the information processing device 1 can be maintained even if the backup power source is not provided by utilizing a nonvolatile memory as a main memory of the processor 2 and writing a course of the process into the nonvolatile main memory 3. Further, in the information processing device 1, a booting speed of a program can be enhanced.

In the information processing device 1 according to this embodiment, the status information 24 is stored into the nonvolatile main memory 3 each time a creation event of the status information 24 occurs. Therefore, even when the power source is abruptly turned off, the status of the processor 2 can be restored to a status before turn-off of the power source by reading the newest status information 24 and the operation of the information processing device 1 can be performed again.

In this embodiment, for example, if a NAND type flash memory or NOR type flash memory is used as the nonvolatile main memory 3, it can be used as a main memory without performing a wear-leveling process that is conventionally performed.

Second Embodiment

In this embodiment, an information processing device that is a modification of the information processing device 1 according to the first embodiment and has a configuration in which the cache memory is formed in a hierarchical form is explained.

FIG. 6 is a block diagram showing one example of a configuration of an information processing device according to this embodiment.

An information processing device 26 includes at least one processor (four processors in the example shown in FIG. 6) 271 to 274, control device 28 and nonvolatile main memory 3. The information processing device 26 can access other devices, for example, the secondary memory device 4, external access device 5, I/O device 6 and the like.

The respective processors 271 to 274 include primary cache memories 291 to 294. When cache miss occurs in the primary cache memories 291 to 294, the processors 271 to 274 transmit a to-be-accessed address (access target address) to the control device 28.

The control device 28 includes a secondary cache memory 10, write buffer 11, access control unit 14, status information creation unit 13 and memory management unit 12. Various processes such as write-back, fetch and restoration processes performed by the control device 28 are the same as those in the first embodiment.

In this embodiment, a case of a two-hierarchical layer configured by the primary cache memories 291 to 294 and secondary cache memory 10 is explained as an example, but the same control device 28 can be similarly applied even in a case wherein the number of hierarchical layers of the cache memory is three or more.

Third Embodiment

In this embodiment, a case wherein a writing number check unit and abnormality detection unit are added to the information processing device according to the first or second embodiments is explained. In this example, a case wherein a writing number check unit and abnormality detection unit are added to the information processing device 1 according to the first embodiment is explained in the present embodiment, but this can be similarly applied to another information processing device according to another embodiment, for example, the information processing device 26 according to the second embodiment.

Figure 7:
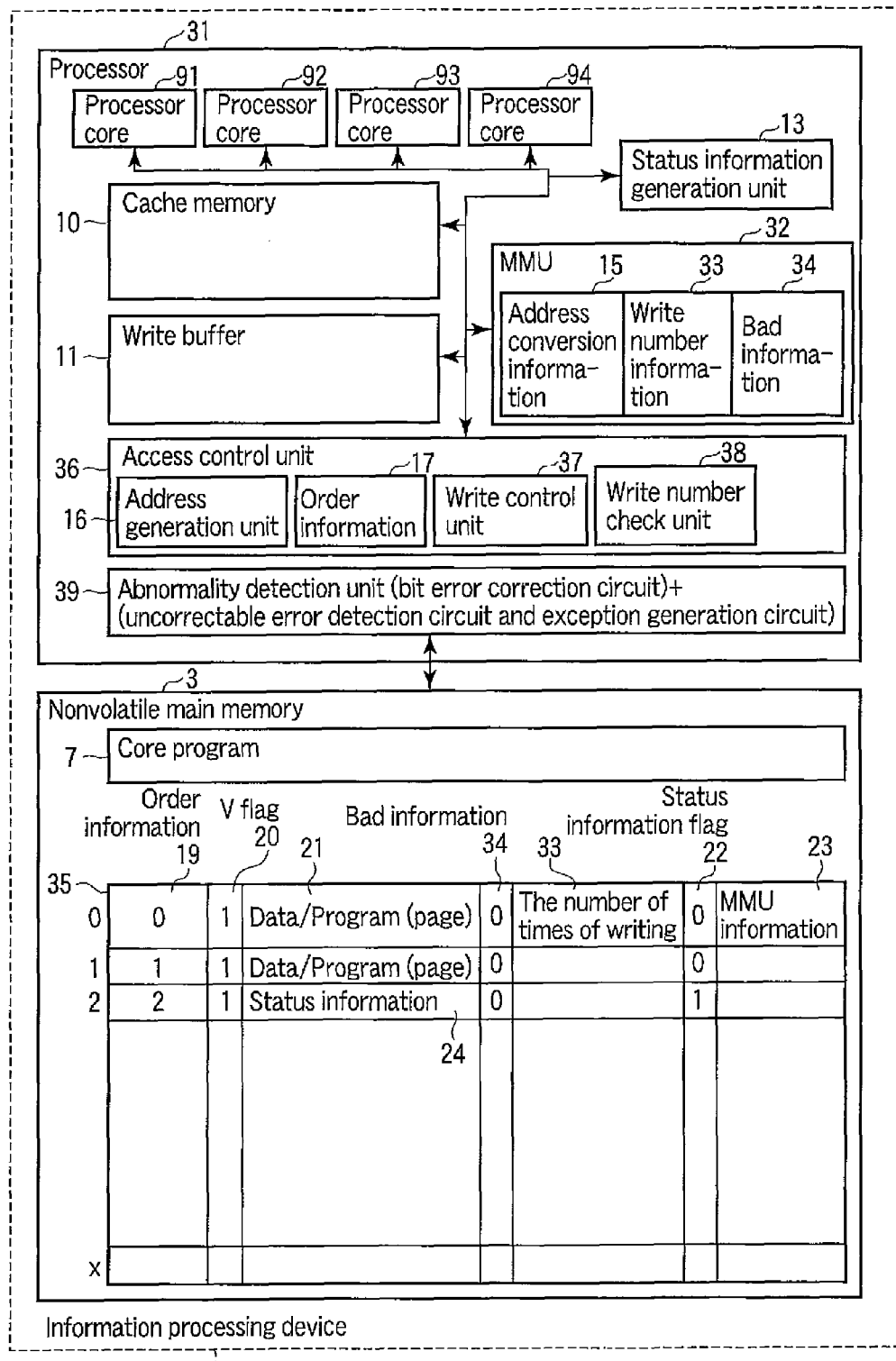
FIG. 7 is a block diagram showing one example of a configuration of an information processing device according to a third embodiment of the invention.

FIG. 7 is a block diagram showing one example of a configuration of an information processing device according to this embodiment.

A memory management unit 32 of a processor 31 of an information processing device 30 according to this embodiment comprises writing number information 33 indicating the number of times of write operations and Bad information 34 for each area (for example, for each address or block) of a nonvolatile main memory 3 in addition to address conversion information 15.

The Bad information 34 is set to a value indicating abnormality when the number of times of the write operations indicated by the writing number information 33 exceeds an upper limit in each area of the nonvolatile main memory 3. The Bad information 34 is also stored in a data unit 35 of the nonvolatile main memory 3.

In this embodiment, the memory management unit 32 updates the writing number information 33 (adds "1" to the number of times of writing associated with entry or an area to be written) at timing at which write operation to the nonvolatile main memory 3 is executed.

A write control unit 37 of an access control unit 36 stores the writing number information 33 into a corresponding area of the nonvolatile main memory 3.

A writing number check unit 38 is provided in the access control unit 36. The writing number check unit 38 checks the number of times of writing for a write destination area at the time of writing into the nonvolatile main memory 3 and causes the exception processing when the number of times of writing exceeds a preset value indicating the upper limit. In the exception processing, software is booted and a necessary process is performed according to the software.

For example, in the exception processing according to the software, the Bad information 34 is set in the entry of the area in which the number of times of writing has exceeded the upper limit with respect to the memory management unit 32 and nonvolatile main memory 3 to prevent writing operation into the entry in which the number of times of writing has exceeded the upper limit from being executed. The memory management unit 32 inhibits writing into the entry in which the Bad information 34 indicates an abnormality.

Further, in the information processing device 30 according to this embodiment, the processor 31 has an abnormality detection unit 39. As the abnormality detection unit 39, for example, an ECC circuit or the like is used. The abnormality detection unit 39 performs a bit error correction process, uncorrectable error detection process and exception generation process.

The above writing number check unit 38 can be made unusable when the number of times of writing has exceeded the upper limit, but a bit error may be sometimes generated before the number of time of writing exceeds the upper limit.

In order to cope with such the error, the abnormality detection unit 39 performs a bit error detection process with respect to the nonvolatile main memory 3. Further, the abnormality detection unit 39 makes a correction when the bit error generated can be corrected. Then, the abnormality detection unit 39 generates the exception processing and performs a necessary process according to software when an uncorrectable bit error is generated. For example, in the exception processing by the software, the Bad information is set in the entry of the area in which an uncorrectable error is generated with respect to the memory management unit 32 and nonvolatile main memory 3 and writing operation into the entry of the area in which the uncorrectable error is generated is prevented. The memory management unit 32 inhibits writing into the entry in which the Bad information 34 indicates an abnormality.

In the embodiment explained above, when the abnormality occurs in the write operation into the nonvolatile main memory 3, adequate processes such as a process of inhibiting usage of an area in which the abnormality occurs and a process of instructing the user to exchange an abnormality part may be performed by use of software.

In the above embodiments, a rate control process of writeback from the cache memory can be performed.

Fourth Embodiment

In the above embodiments, the memory (storage) area of the nonvolatile main memory 3 may be divided according to types of data items such as program items, data items, status information items, for example.

Figure 8:
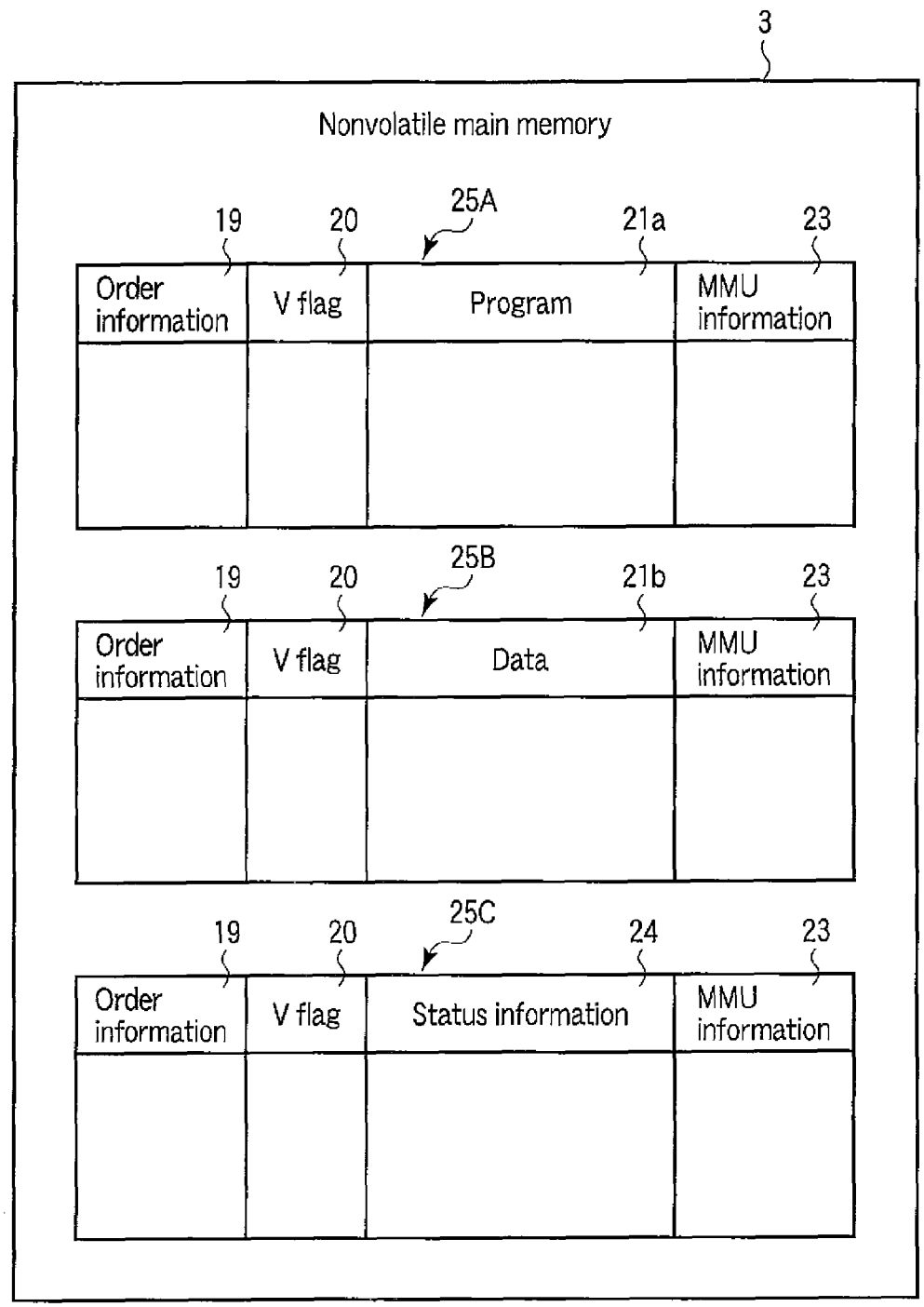
FIG. 8 is a block diagram showing one example of a nonvolatile main memory in which programs, data items, status information items are separately stored in plural data portions according to a fourth embodiment of the invention.

FIG. 8 is a block diagram showing one example of a nonvolatile main memory 3 in which program items, data items, status information items are separately stored in plural data portions (memory areas).

An address generation unit 16 of each of access control units 14, 36 determines whether a content to be written is a program 21a, data 21b or status information 24. Then, if the content to be written is the program 21a, the address generation unit 16 generates an address to store the to-be-written program 21a into a data portion (memory area) 25A. If the content to be written is the data 21b, each of the access control unit 14, 36 generates an address to store the to-be-written data 21b into a data portion (area) 25B. If the content to be written is the status information 24, each of the access control unit 14, 36 generates an address to store the to-be-written status information 24 into a data portion (area) 25C. The order information 19, V flag 20 and MMU information 23 are associated with each of the to-be-written contents.

The MMU information 23 may be stored in another memory area.

In the above embodiments, the processors 2, 271 to 274, 31 may access the nonvolatile main memory 3 via a cache memory.

Figure 9:
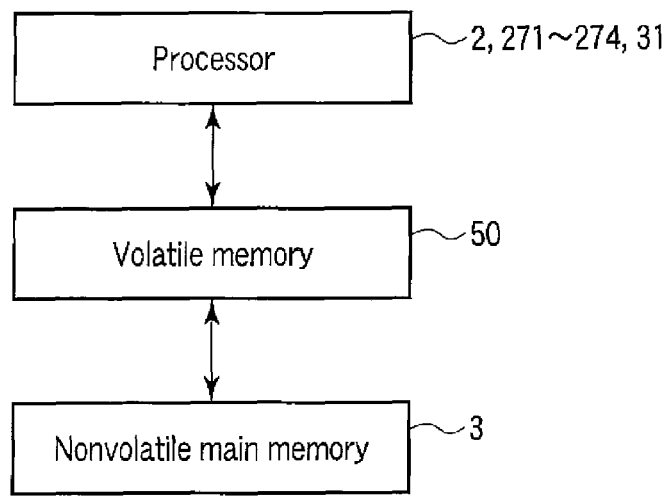
FIG. 9 is a block diagram showing one example of a nonvolatile main memory accessed from processors via a volatile memory.

FIG. 9 is a block diagram showing one example of the nonvolatile main memory 3 accessed from the processors 2, 271 to 274, 31 via a volatile memory.

A processing speed can be enhanced by providing a volatile memory 50 between the processors 2, 271 to 274, 31 and the nonvolatile main memory 3.

Fifth Embodiment

In this embodiment, modifications of the first to fourth embodiments are explained. In the following description, the modification of the first embodiment is explained, but the same explanation is applied to the modifications of the second to fourth embodiments.

FIG. 10 is a block diagram showing one example of a configuration of an information processing device according to this embodiment.

An access control unit 14 further includes a performance lowering (reduction) detection unit 51.

A core program 7 includes a performance lowering (reduction) suppression program 52.

When a writable area (the number of writable entries) becomes less in a nonvolatile main memory 3, the performance of access to the nonvolatile main memory 3 may be sometimes lowered. Further, if no writable area is obtained, it becomes impossible to continuously perform the process.

The performance lowering detection unit 51 detects whether the performance of access from the processor 2 to the nonvolatile main memory 3 in the information processing device 1 is lowered or not. For example, when time for detecting a write area exceeds a set value, when the number of writable entries becomes less than or equal to a set value or when a combination of the above two cases occurs, the performance lowering detection unit 51 detects an occurrence of a lowering in the performance.

The performance lowering detection unit 51 issues an exception command to the processor 2 when occurrence of a lowering in the performance of access from the processor 2 to the nonvolatile main memory 3 is detected.

When an exception command is issued, the processor 2 executes the performance lowering suppression program 52 in the core program 7.

The processor 2 performs a process of suppressing a lowering in the performance such as a garbage collection process according to the performance lowering suppression program 52.

For example, the performance lowering suppression program 52 is used to search for the current nonvolatile main memory 3 and perform various processes such as a process of setting those of plural entries that can be collected together into one entry, a process of collecting and rearranging (relocating) only valid data items when valid data items and erased data items are provided together in the nonvolatile main memory 3, and a process of moving data with low access frequency, data with low importance, data with low frequency of usage and data with low priority to another memory and increasing a blanked area, or a combination of the above various processes.

In the embodiment described above, the performance of the nonvolatile main memory 3 can be prevented from being lowered due to the reason that the writable area becomes less.

An influence on the normal process can be suppressed to minimum by performing the process of the performance lowering suppression program 52 in parallel with the normal process.

Further, the ability of the processor 2 can be prevented from being lowered by the exception processing because of due to providing a processor exclusively used for performing the process of the performance lowering suppression program 52.

The control operation of each of the above embodiments can also be applied to a case wherein the nonvolatile main memory is used not for the main memory but for another purpose.

Sixth Embodiment

In each of the above embodiments, the nonvolatile main memory 3 is used as a main memory.

However, a composite (hybrid) main memory having different types of semiconductor memories with different properties may be used instead of the nonvolatile main memory 3 in each of the above embodiments.

In the following description, a case where a composite main memory is applied in the first embodiment is explained, but the same explanation is applied to a composite main memory used in each of the second to fifth embodiments.

Figure 11:
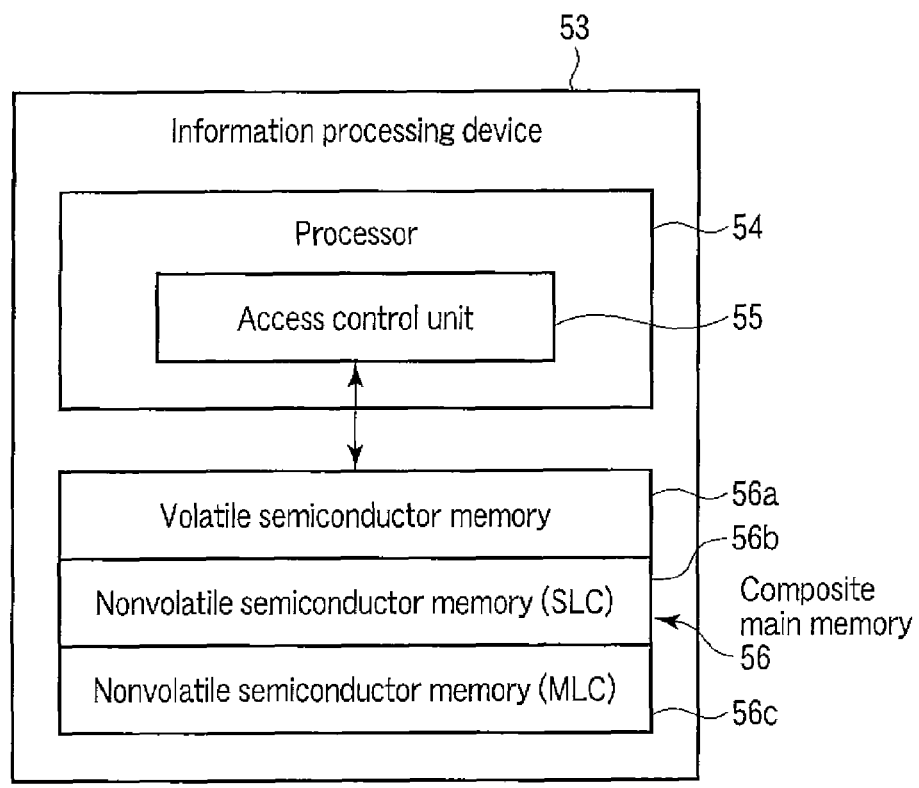
FIG. 11 is a block diagram showing one example of an information processing device including a composite main memory according to a sixth embodiment of the invention.

FIG. 11 is a block diagram showing one example of an information processing device including a composite main memory according to this embodiment.

An information processing device 53 includes a processor 54 and composite main memory 56.

The processor 54 comprises an access control unit 55 that controls access to the composite main memory 56.

The composite main memory 56 includes a combination of plural types of semiconductor memories. In this embodiment, for example, the composite main memory 56 includes a volatile semiconductor memory 56a and nonvolatile semiconductor memories 56b, 56c.

For example, the volatile semiconductor memory 56a is a DRAM. For example, the volatile semiconductor memory 56b is a single level cell (SLC) NAND type flash memory. For example, the volatile semiconductor memory 56c is a multi level cell (MLC) NAND type flash memory. The MLC is lower in the read and write operation speeds and in the reliability than the SLC. However, the MLC is higher in an element integration density than the SLC and is suitably used for large capacity.

In this embodiment, the volatile semiconductor memory 56a is higher than the nonvolatile semiconductor memory 56b in the reliability or durability. And the volatile semiconductor 56a is larger than the nonvolatile semiconductor memory 56b in the number of times of permitted access (the number of accessible time). Further, the nonvolatile semiconductor memory 56b is higher than the nonvolatile semiconductor memory 56c in the reliability or durability. And the nonvolatile semiconductor memory 56b is larger than the nonvolatile semiconductor memory 56c in the number of times of permitted access.

The address generation unit 16 of the access control unit 55 selects a memory of a write destination in the composite main memory 56 so that the number of time of accesses or access frequency of the volatile semiconductor memory 56a will become larger or higher than the number of time of accesses or access frequency of the nonvolatile semiconductor memory 56b, and the number of times of accesses or access frequency of the nonvolatile semiconductor memory 56b will become larger or higher than the number of times of accesses or access frequency of the nonvolatile semiconductor memory 56c.

The memory of a write destination may be selected by the access generation unit 16 based on at least one of information such as the number of times of accesses, importance, type and priority of to-be-written data.

It is assumed that the access frequency indicates the number of times of accesses for each unit time.

For example, the access generation unit 16 selects a memory of a write destination based on a memory selection threshold value and writing number information 33 of the third embodiment.

The access control unit 16 generates an address used for additional writing explained in the first to fourth embodiments for a memory selected from a plurality of memories of the composite main memory 1.

In this embodiment, the service life of a main memory can be lengthened when the nonvolatile memory is used as the main memory.

As the nonvolatile semiconductor memories 56b, 56c, for example, other types of flash memories such as NOR type flash memories, phase change memories (PRAMs), resistive random access memories (ReRAMs) can be used instead of the NAND type flash memories.

The control operation of the above embodiment can also be applied to a case wherein a composite memory is used not for the main memory but for another purpose.

What is claimed is:

1. An information processing device comprising:
    a processor;
    an address generation section that generates a write address indicating a write position in a nonvolatile memory in a write operation, write addresses generated by the address generation section being sequential;
    an order generation section that generates order information in the write operation, the order information indicating an order of the write operation; and
    a write control section that writes write-data to the write position of the nonvolatile memory indicated by the write address generated by the address generation section, and writes the order information related to the write-data to the nonvolatile memory.

2. The information processing device according to claim 1, wherein
    the nonvolatile memory is used as a main memory by the processor.

3. The information processing device according to claim 1, further comprising
    a memory management unit including address conversion information,
    wherein the address generation section generates a write address that is not used in the address conversion information, and generates a write address from an initial value after the write address reached a preset value.

4. The information processing device according to claim 1, further comprising a status information generation section that generates status information of the processor,
    wherein the write control section further writes the status information generated by the status information generation section to the write position of the nonvolatile memory indicated by the write address generated by the address generation section and writes the order information related to the status information, and
    further comprising a restoration section that reads newest status information based on the order information from the nonvolatile memory and restores the processor by use of the newest status information in a restore operation of the processor.

5. The information processing device according to claim 4, wherein the restoration section is realized by causing the processor to execute a program stored in the nonvolatile memory.

6. The information processing device according to claim 1, further comprising a memory management unit including address conversion information,
    wherein the write control section further writes the address conversion information in the memory management unit to the write position of the nonvolatile memory indicated by the write address generated by the address generation section and writes order information related to the address conversion information, and
    further comprising a restoration section that reads newest address conversation information based on the order information from the nonvolatile memory and restores the memory management unit by use of the newest address conversion information in a restore operation of the processor.

7. The information processing device according to claim 1,
    further comprising a status information generation section that generates status information of the processor, a memory management unit including address conversion information, and an abnormality detection section that detects an abnormality of the nonvolatile memory,
    wherein the write control section further writes the status information generated by the status information generation section to the write position of the nonvolatile memory indicated by the write address generated by the address generation section, writes the order information related to the status information, writes the address conversion information in the memory management unit, and writes order information related to the address conversion information, and
    further comprising a restoration section that reads newest status information and newest address conversion information based on the order information from the nonvolatile memory and restores the processor and the memory management unit by use of the newest status information and newest address conversion information when the abnormality is detected by the abnormality detection section.

8. The information processing device according to claim 1,
    wherein the write control section further writes writing number information indicating the number of time of writing associated with each area or entry of the nonvolatile memory,
    further comprising a writing number check section that inhibits writing with respect to an area or entry in which the number of times of writing indicated by the writing number information exceeds a threshold value.

9. The information processing device according to claim 1, further comprising
    an abnormality detection section that detects an error in the nonvolatile memory, corrects the error when the error is correctable, and inhibits writing with respect to an area or entry where the error is uncorrectable.

10. The information processing device according to claim 1, wherein
    the nonvolatile memory includes a plurality of areas, and
    the address generation section determines a type of data to be written, selects an area of the plurality of areas that corresponds to the type, and executes a sequential address generation for the selected area and selects the write address that is not used in the selected area.

11. The information processing device according to claim 1, further comprising a volatile memory between the processor and the nonvolatile memory.

12. The information processing device according to claim 1, further comprising a detection section that detects a lowering in a performance of access to the nonvolatile memory from the processor, and
    a performance reduction suppression section that performs a garbage collection process when the detection section detects a lowering in the performance.

13. The information processing device according to claim 1, further comprising a composite memory that includes the nonvolatile memory and another semiconductor memory,
    wherein the address determination section selects a memory of a storage destination from the nonvolatile memory and semiconductor memory so that the number of times of accesses or access frequency with respect to a first memory having higher reliability or durability larger than the number of times of accesses or access frequency with respect to a second memory the composite memory having lower reliability or durability.

14. A processor comprising:
an address generation section that generates a write address indicating a write position in a nonvolatile memory in a write operation, write addresses generated by the address generation section being sequential;
an order generation section that generates order information in the write operation, the order information indicating an order of the write operation; and
a write control section that writes write-data to the write position of the nonvolatile memory indicated by write address generated by the address generation section, and writes the order information related to the write-data to the nonvolatile memory.

15. The processor according to claim 14, wherein the nonvolatile memory is used as a main memory.

16. The processor according to claim 14, further comprising
a memory management unit including address conversion information,
wherein the address generation section generates a write address that is not used in the address conversion information, and generates a write address from an initial value after the write address reached a preset value.

17. The processor according to claim 14, further comprising a status information generation section that generates status information of the processor, and an abnormality detection section that detects an abnormality of the nonvolatile memory,
wherein the write control section further writes the status information generated by the status information generation section to the write position of the nonvolatile memory indicated by the write address generated by the address generation section, writes the order information related to the status information, writes the address conversion information in the memory management unit, and writes the order information related to the address conversion information, and
further comprising a restoration section that reads newest status information and newest address conversion information based on the order information from the nonvolatile memory and restores the processor and the memory management unit by use of the newest status information and newest address conversion information when the abnormality is detected by the abnormality detection section.

18. The processor according to claim 14, wherein the write control section further writes writing number information indicating the number of times of writing associated with each area or entry of the nonvolatile memory,
further comprising a writing number check section that inhibits writing with respect to an area or entry in which the number of time of writing indicated by the writing number information exceeds a threshold value.

19. A memory management method comprising:
generating a write address indicating a write position in a nonvolatile memory in a write operation, generated write addresses being sequential, and generating order information in the write operation, the order information indicating an order of the write operation; and
writing write-data to the write position of the nonvolatile memory indicated by the generated write address, and writing the order information related to the write-data to the nonvolatile memory.

20. The memory management method according to claim 19, wherein the nonvolatile memory is used as a main memory by the processor.

* * * * *